United States Patent [19]

Geissler

[11] 4,194,234
[45] Mar. 18, 1980

[54] SIMULTANEOUS MULTI DIRECTIONAL SINGLE SOURCE MULTIPLE REFLECTOR ELECTRONIC PHOTO FLASH UNIT

[75] Inventor: Udo M. Geissler, Munich, Fed. Rep. of Germany

[73] Assignee: Patent-Treuhand-Gesellschaft für Elektrische Gluhlampen mbH, Munich, Fed. Rep. of Germany

[21] Appl. No.: 940,011

[22] Filed: Sep. 6, 1978

[30] Foreign Application Priority Data

Sep. 8, 1977 [DE] Fed. Rep. of Germany ....... 2740487

[51] Int. Cl.² ............................................ G03B 15/02
[52] U.S. Cl. ...................................... 362/17; 362/18; 362/217; 362/283; 362/297; 362/346; 362/347
[58] Field of Search ................. 362/18, 217, 283, 297, 362/346, 347

[56] References Cited

U.S. PATENT DOCUMENTS 3,609,340  9/1971  Habro ............................. 362/347 X Primary Examiner—Stephen J. Lechert, Jr.
Attorney, Agent, or Firm—Frishauf, Holtz, Goodman & Woodward

[57] ABSTRACT

An electronic flash gun, particularly for photographic purposes, in which a single electronic flash discharge tube, which may be elongated or essentially ball or spherical-shaped, has associated therewith a plurality of reflector elements of which at least one can swivel or pivot about the flash tube to permit directing light from the single flash tube in multiple directions, for example for simultaneous illumination of a photographic subject directly as well as by bounce or reflected, indirect illumination.

10 Claims, 6 Drawing Figures

SIMULTANEOUS MULTI DIRECTIONAL SINGLE SOURCE MULTIPLE REFLECTOR ELECTRONIC PHOTO FLASH UNIT

The present invention relates to an illuminating device, and more particularly to a photo flash unit in which a single photo flash tube is arranged to be associated with a plurality of reflectors so that, simultaneously, direct illumination as well as indirect illumination of an object to be photographed can be obtained, for example by simultaneously obtaining from a single unit direct and "bounce" light.

BACKGROUND AND PRIOR ART

Various types of photographic and other reflector—light source units are known. Usually, a light source associated with a reflector, as a single unit, the reflector and light source combination being pivotably secured in a housing, if it desired to provide for variation of the direction of light to be received; in other constructions, the reflector is pivotable within the housing, the light source remaining fixed. If the illuminating device is located in a fixed position with respect to the object to be illuminated, it is possible to direct the radiation from the source either directly or towards a reflecting element, for example the ceiling of a room, a reflecting screen, or the like, if the reflector can be pivoted. The object, however, can be illuminated only either directed or indirectly. If both direct and indirect illumination are desired, then it is necessary to use a plurality of units which is well known in the photographic field, by employing so-called "slave" units, ganged or coupled with the main unit which may be mounted on a camera. Since these units are all, individually, expensive, and frequently bulky and difficult to handle if separate from the camera, it is usually necessary to either have an assistant, a second tripod unit, or to dispense with multiple illumination. The possiblility to obtain direct as well as indirect or "bounce" illumination frequently is of importance, particularly in photography. The image quality is enhanced if an object to be photograped can be illuminated from various directions to obtain a generally diffused "bathed in light" effect, coupled with individual highlights or, if lateral screens are employed, to obtain the "Rembrandt lighting" effect.

Photo flash units, particularly electronic photo flash units to illuminate an object or a scene are ill-suited to obtain light from various directions and, as currently manufactured, are too expensive or bulky to permit directing light to an object from more than one direction. The various referenced publications illustrate typical photo flash units of this type.

U.S. Pat. No. 3,610,913 describes an electronic flash unit having a reflector which is subdivided into a plurality of reflector portions, all located in a circle. Each one of the portions has a flash lamp mounted therein. This unit requires a multiplicity of flash lamps and, while providing an interesting light pattern, is complex and costly. German Utility Model GM No. 68 03 112 describes a reflector which is subdivided into a plurality of sections, utilizing a U-bend flash lamp. Japanese Utility Model Patent GM No. 46-3574 shows a reflector which is fixed with respect to a linear flash tube, the reflector being subdivided into respective segments. All these arrangements permit illumination to be directed only in the predetermined pattern set by the manufacturer of the flash unit.

THE INVENTION

It is an object to provide an illumination device with only a single light source, and more particularly a photo flash lamp of the flash discharge type, which permits illumination of an object both directly as well as indirectly or, generally, from more than one direction, without additional optical devices, such as attachment optics, or the like, to thereby generate a plurality of light beams or lobes.

Briefly, a holder has a gas discharge lamp secured therein about which a plurality of reflectors are positioned. These reflectors are positioned in the light path from the gas discharge lamp to reflect light therefrom; at least one of the reflectors, and preferably all are individually movable with respect to the light source and another reflector element to permit directing light from the single light source in multiple directions by the respective reflector elements. The flash lamp, in a preferred form, is an electronic flash unit which may have a flash duration or flash intensity which is computer controlled, as is well known in the electronic flash art. The arrangment can also be so made that it is flashed repeatedly, for example for use as an illumination device with amateur-type motion picture film, or to obtain special illumination effects, for example for advertising display purposes.

Drawings, illustrating preferred example

Figure 1:
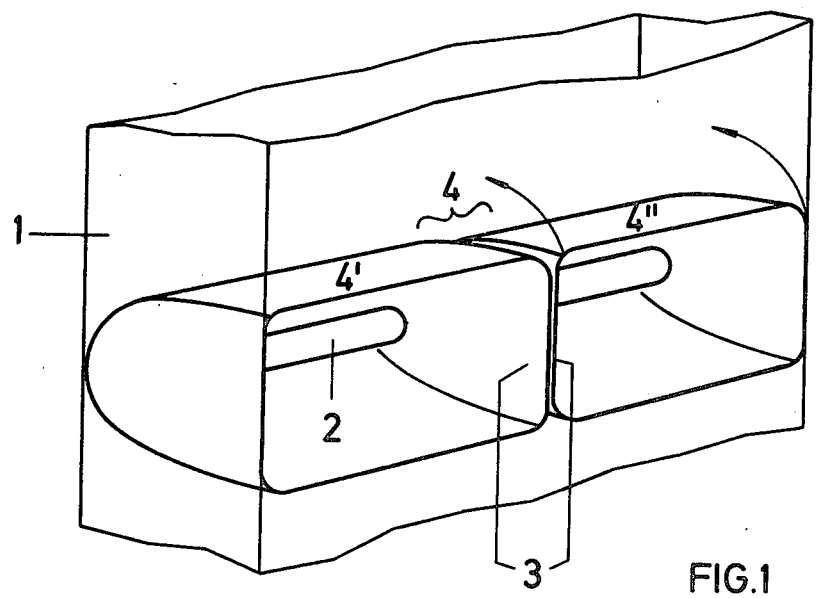
FIG. 1 is a schematic general view of an electron flash unit in accordance with the present invention.

FIG. 1 shows the general concept of the invention used with a tubular light source 2. An electronic photo flash unit has a housing 1 which includes, besides the elongated flash tube 2, the usual electronic circuitry, battery unit, if used, capacitor and discharge control circuitry, and the like. The general arrangement with three (FIG. 2) reflector elements 4', 4" forming the reflector 4 for the elongated light source 2 is the preferred embodiment. The partial reflector elements, 4', 4", and together forming a reflector 4, are trough-shaped, with a generally parabolic or ellipsoid cross section, as seen in FIG. 1, and are axially staggered along the length of the flash tube 2. The reflector elements 4', 4" maybe laterally separated by separating walls 3. Preferably, both the reflectors 4' as well as 4" are pivotably mounted within the housing 1 to pivot about the axis of flash tube 2 at least 90° upwardly, but possibly to pivot in the opposite direction, that is, to provide for pivoting movement of one reflector element with respect to the other by 180°, and possibly even more. As shown, the reflector 4" can be pivoted from the horizontal position, shown in FIG. 1, upwardly and rearwardly. Reflector 4' also can be pivoted. It is not necessary that both reflectors are pivotably arranged. For most photographic use, it is sufficient if one of the two reflectors of the unit can pivot, and the pivoting range of the movably secured reflector is about 90°. If more than two partial reflector units are provided, as illustrated, for example, in FIG. 2 where three units are located next to each other, one or two of the units should be pivotable, the third one may be fixed although, for greatest versatility, all three reflector units should be capable of pivoting with respect to each other.

Figure 2:
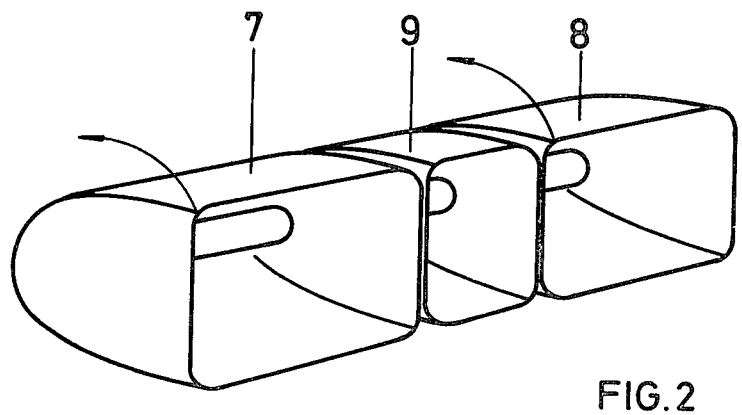
FIG. 2 illustrates a tubular elongated flash tube used with three trough-type reflectors.

FIG. 2: Three reflectors 7, 8, 9 are located to surround an elongated photo flash tube. The outer reflectors 7, 8 are pivotable about 90°, as schematically indicated by the arrows; a central reflector section 9 is fixed with respect to the tube and with respect to the housing. The central reflector 9 may be smaller than the outer reflectors, for example about one-half or two-thirds the width thereof.

Figure 3:
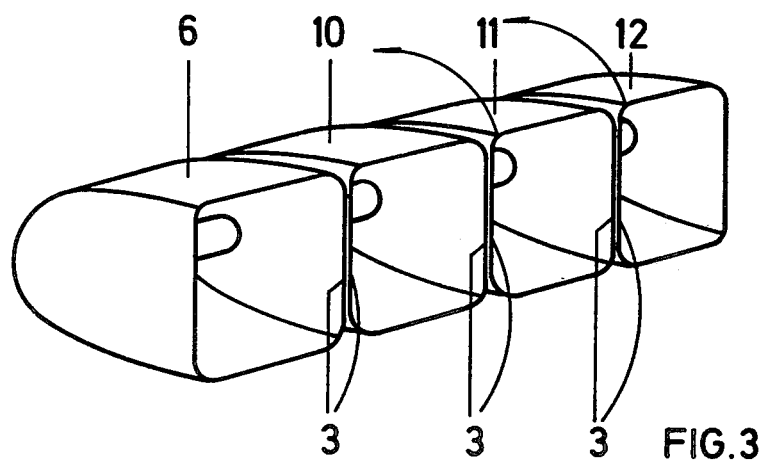
FIG. 3 is unit having four trough-type partial reflector elements.

FIG. 3: Four trough-like reflector sections 6, 10, 11, 12, all of essentially equal size, are located to surround a single elongated flash tube. The reflector sections all have separating walls 3. Two of the reflector sections, for example sections 11, 12 are rotatable with respect to the other two. Any suitable combination of reflector sections may be made to be rotatable, or to remain fixed; for example, and for ease of operation, sections 6 and 12 may be made rotatable, and sections 10, 11 remain fixed; or vice versa.

Figure 4:
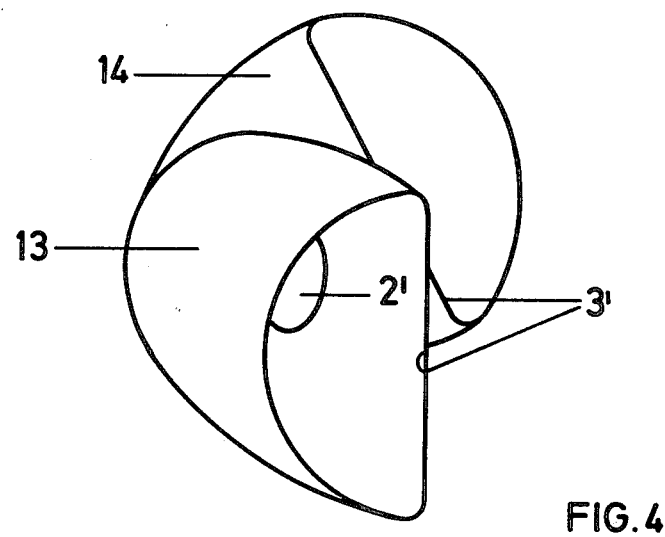
FIG. 4 shows the invention used with a ball-shaped light source and having two partial semi-parabeloid reflectors of semi-cup shape.

The light source itself need not be an elongated flash tube; some flash tubes are essentially ball or point-shaped. FIG. 4 illustrates two reflector sections 13, 14, each with inner walls 3' which surround an essentially point-like source 2'. This point source is located within a bulb which, essentially, is spherical. For use with such a bulb, the reflectors are preferably cup-shaped, that is, are half-ellipsoids or, essentially halves of a single paraboloid. Reflector 14 is rotatable with respect to reflector 13 which may be fixed in the housing. Both reflectors 13, 14 may, of course, be rotatable or pivotable with respect to the housing.

Figure 5:
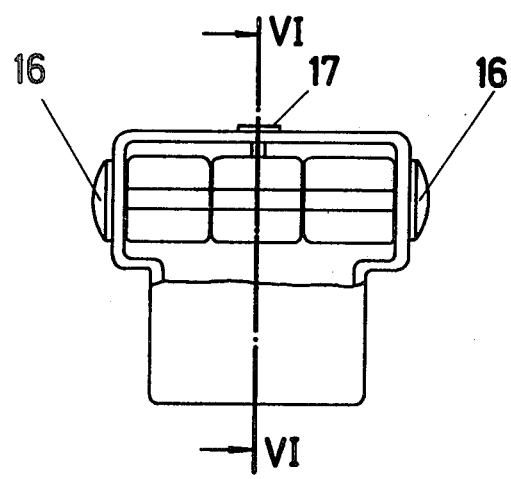
FIG. 5 is a highly schematic front view of a photographic electronic flash unit with an elongated light source shown in detail in FIG. 2.
Figure 6:
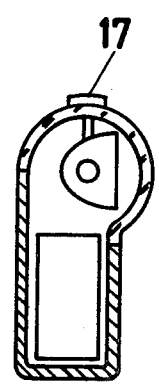
FIG. 6 is a schematic cross-sectional view of the unit of FIG. 5 taken along lines VI—VI.

FIGS. 5 and 6 illustrate, highly schematically, a photo flash arrangement for a unit similar to that of FIG. 2 in which, however, all three partial reflector elements are of essentially the same size. The outer elements are attached to operating knobs 16 which control the relative pivoting motion thereof with respect to the frame of the housing. The center reflector is connected to a slider 17, operating in a groove in the housing frame in order to individually adjust the pivoted position of the center reflector. The operating elements 16, 17 preferably are provided with scales cooperating with a marker on the housing or, respectively, the scales may be formed on the housing with a marker on the operating elements.

Pivoting respective reflector units permits controlling the amount of light which is beamed in the respective direction of the pivot axis of the respective reflector. Thus, a subject can be illuminated in different ways: directly, for example, if the respective reflector is directed on the subject; and indirectly, by further reflected radiation if another reflector is directed towards a reflecting surface, such as, for example, the ceiling of a room, a reflecting screen, or the like. Depending on the position of the reflecting units, therefore, the shadow distribution and illumination effect on the subject to be illuminated or photographed, can be varied. Of course, the arrangement can be mounted with respect to a camera in any desired position, as illustrated in FIG. 5, with the axis of the flash tube horizontally, or, as desired, rotated 90° with respect to the showing of FIG. 5, with the axis of the flash tube vertically.

Various changes and modifications may be made, and features described in connection with any one of the embodiments may be used with any of the others, within the scope of the inventive concept.

I claim:

1. Single-source multiple reflector electronic photo flash unit having
    a holder (1);
    a single gas discharge lamp (2) positioned in said holder;
    and reflector means (4) positioned in the light path from the gas discharge lamp to reflect light therefrom
    wherein, in accordance with the invention
    the reflector means comprises
    a plurality of individual reflector elements (4',4"; 7, 8, 9; 6, 10, 11, 12; 13, 14) located adjacent each other of which at least one is relatively movable with respect to the light source and with respect to another relector element to permit directing light from the single gas discharge lamp in multiple directions upon flash-illumination thereof.

2. Unit according to claim 1, wherein (FIGS. 1–3, 5, 6) the single gas discharge lamp is an elongated photo flash tube (2) and the reflector elements comprise trough-shaped reflectors partly surrounding said elongated flash tube, and axially stacked on said flash tube.

3. Unit according to claim 2, wherein the reflectors elements have reflecting separating walls therebetween extending in a plane essentially transverse to the axis of the elongated flash tube.

4. Unit according to claim 1, wherein (FIG. 4) the gas discharge lamp is a point source having an essentially ball-shaped or spherical bulb (2');
    and the reflector elements are half bowl shaped and form essentially split or semi-parabaloids or essentially semi-ellipsoids, surrounding said gas discharge lamp.

5. Unit according to claim 4, wherein the reflector elements each have a separating side wall (3') which is apertured, the ball or spherical-shaped bulb fitting into the apertures of the side wall, said side wall separating said reflector elements into said two semi-bowl-shaped sections.

6. Unit according to claim 1, wherein one of the reflector elements is fixed in the holder.

7. Unit according to claim 1, wherein all reflector elements are movable in the holder.

8. Unit according to claim 1, wherein the reflector elements are of essentially parabolic or part-elliptical cross section, the flash gas discharge lamp (2, 2') being located at least approximately at the focal point of the parabola or ellipse, and the movable reflector element is pivotable about an axis passing through said focal point.

9. Unit according to claim 2 wherein the reflector elements are of essentially parabolic or part-elliptical cross section, the flash gas discharge lamp (2, 2') being located at least approximately at the focal point of the parabola or ellipse, and the movable reflector element is pivotable about an axis passing through said focal point.

10. Unit according to claim 9, wherein the reflectors elements have reflecting separating walls therebetween extending in a plane essentially transverse to the axis of the elongated flash tube.

* * * * *